3,490,888
METHOD OF INCREASING DIELECTRIC CONSTANT OF CORDIERITE GLASS - CERAMIC ARTICLES
Guy E. Strong, Elmira, N.Y., assignor to Corning Glass Works, Corning, N.Y., a corporation of New York
No Drawing. Filed July 22, 1966, Ser. No. 567,054
Int. Cl. C03b 1/00, 5/22
U.S. Cl. 65—33                5 Claims

ABSTRACT OF THE DISCLOSURE

This invention relates to the production of $TiO_2$-nucleated glass-ceramic articles in the $MgO$-$Al_2O_3$-$SiO_2$ composition field with increased dielectric constants at 25° C. due to the presence of 0.2–1.5% $As_2O_3$ therein.

---

Glass-ceramic articles or semicrystalline ceramic articles, as they have frequently been termed, are produced through the controlled heat treatment of glass bodies. Thus, as is explained in the basic patent in this field, No. 2,920,971, a glass-forming batch which commonly contains a nucleating agent or crystallization catalyst is melted, the melt cooled to a glass shape of the desired configuration, and this glass shape then subjected to a rather carefully-defined heat treating schedule. During the heat treatment process, submicroscopic nuclei are first formed which act as sites for the growth of crystals thereon. At the conclusion of the heat treatment, the glass shape has been converted into a body containing innumerable fine-grained crystals relatively uniform in size and randomly dispersed in a glassy matrix, the glassy matrix consisting of the uncrystallized portion of the original glass. Since the resultant body is highly crystalline, the crystals generally comprising at least 50% by weight of the body and frequently over 90%, the chemical and physical properties of the body are closely dependent upon the crystals grown therein. In other words, a glass-ceramic article generally behaves more like a ceramic or crystalline body rather than a glass body.

It has long been recognized that a strong glass-ceramic body having reasonably good resistance to thermal shock and very good electrical insulating properties would have many commercial applications. For example, such products would be useful for electrical insulators, high strength porcelain-type products, and microwave windows. One important factor determining the utility of a particular material as an electrical insulating component is its dielectric constant which represents a measure of the ability of a dielectric (non-conducting) material to store electrical potential energy under the influence of an electric field. In general, the higher the dielectric constant the more advantageous the material is as an electrical insulating element.

Therefore, the principal object of this invention is to provide glass-ceramic bodies exhibiting high mechanical strength, good resistance to thermal shock, and high dielectric constants.

I have discovered that the inclusion of a very narrowly-defined amount of arsenic, computed as $As_2O_3$, in a limited area of $TiO_2$-nucleated glass-ceramics in the $MgO \cdot Al_2O_3 \cdot SiO_2$ system will yield products having the desired physical properties, including a dielectric constant greater than 5.2 (8.6 kmc.) at 25° C., and satisfactory chemical durability and, in addition, the original glass exhibits good melting and working characteristics. In its broadest aspects, my invention comprises melting a batch for a glass consisting essentially, by weight as analyzed on the oxide basis, of 45–62% $SiO_2$, 9–20% $MgO$, 15–32% $Al_2O_3$, 7–12% $TiO_2$, and 0.2–1.5% $As_2O_3$, the sum of these recited components constituting at least 95% by weight of the glass, cooling this melt and forming a glass shape therefrom, and thereafter exposing this glass shape to a temperature between about 750°–1400° C. for a period of time sufficient to attain the desired crystallization.

Defining the invention in terms of the examples set out hereinafter in the tables, the proper batch materials were carefully mixed together and melted in closed crucibles for about six hours at 1600° C. The melts were poured onto a steel plate to produce patties about ½" thick and these patties then placed into an annealing oven and cooled slowly to room temperature. The annealed patties, or frequently strips cut therefrom, were transferred to a furnace and heat treated in accordance with the various time-temperature schedules recorded in Table II to convert the glass to a glass-ceramic body. After heat treating, the crystallized shapes were cooled to room temperature.

Various embodiments in manufacturing procedure are possible from the basic discussion presented above. Hence, instead of cooling the glass body to room temperature (to permit inspection for glass quality) before beginning the heat treating cycle, the melt may merely be quenched to just below the transformation range and then reheated to crystallize the glass body. The transformation range is that temperature at which a liquid melt is deemed to have been transformed into an amorphous solid, this temperature being in the general vicinity of the annealing point of the glass.

Further, although a satisfactorily crystallized article can be obtained by simply exposing the glass article to some temperature between 750°–1400° C. and holding thereat for sufficient time to permit reasonably complete crystallization, my preferred heat treatment consists of a two-step schedule. As the glass is heated above its annealing point, nuclei are first formed which provide sites for the development of crystals. The growth of crystals in a glass proceeds more rapidly as the temperature of heat treatment approaches the liquidus of the crystal phase. Therefore, although the crystals possess a melting point higher than the softening point of the glass, in the initial stages of crystallization the proportion of crystals to glassy matrix is very small and the article will not maintain its shape if the temperature thereof is raised too rapidly beyond its softening point. Thus, the rate of temperature increase must be in substantial balance with the rate of crystallization or deformation of the body will result from a lowering of the viscosity thereof. I have learned that deformation of the body can be minimized where a dwell period at the lower end of the crystallization temperature range is utilized or the temperature of the body is raised quite slowly through the lower end of this range. This holding period permits the growth of sufficient crystallization to provide a supporting structure such that the geometry of the body is maintained as the temperature is raised to expedite further crystallization. Thus, I have found it particularly advantageous to hold the glass articles at temperatures ranging from about 780°–840° C. for at least one hour before heating to a higher temperature.

The crystallization process of the invention is founded upon a time-temperature relationship. Thus, a relatively long period of time, say 24 hours, will be required at 750° C. to secure the desired substantially complete crystallization, but at 1400° C. the crystallization may be completed within an hour or even less. Nevertheless, as has been explained above, the rate of temperature increase within the crystallization range must balance the decrease in viscosity of the body or the article will undergo substantial deformation. Longer heat treating times are possible but since the quality and the quantity of the crystallization are not considerably improved, such times are not deemed economically practical.

The speed at which the glass body can be heated from room temperature or the transformation range to the crystallization range is dependent upon the resistance to thermal shock inherent in the glass and the size and geometry of the shape involved. Since the coefficients of thermal expansion of these glasses are relatively low, about $30-45 \times 10^{-7}/°$ C. ($25°$ C.–$300°$ C.), the shapes to be heat treated in the following examples were plunged directly into a furnace maintained at the lower of the recited temperatures in the heat treating schedules. Likewise, the rate of cooling the crystallized article after heat treatment is dependent upon the thermal shock resistance of the material and the size and geometry of the article. These glass-ceramics have coefficients of expansion ranging about $14-70 \times 10^{-7}/°$ C. ($25°$–$300°$ C.) and the small pieces utilized in the following examples could be removed directly from the furnace and cooled in the surrounding air. However, in the noted instances, a monitored rate of cooling was employed.

Summarizing the process steps in the preferred embodiment of my invention, the method consists of: (1) melting a glass-forming batch of the proper composition; (2) cooling the melt to at least below the transformation range of the melt and forming a glass shape therefrom; (3) reheating the glass shape to about 780°–840° C. for about 1–8 hours: (4) raising the temperature of the shape to about 1180°–1370° C. for about 1–8 hours; and then (5) cooling the crystallized shape to room temperature.

The recited narrow ranges of $MgO$, $Al_2O_5$, $SiO_2$, and $TiO_2$ are critical to this invention since amounts much outside these ranges will not result in the development of a glass-ceramic body wherein the crystallization is substantially all cordierite, and the effect produced on the dielectric constant of the product by $As_2O_3$ additions will not be felt. $As_2O_3$ is very volatile at the melting temperatures utilized with these glasses, losses of 50–75% by weight being common. Hence, the amount added to the match must be enough to compensate for this loss. Where quantities much more than about 1.5% by weight of $As_2O_3$ are retained in the glass, the glass quality due to seeds and blisters becomes poor because of the large amount of arsenic which must be included in the starting batch. Nevertheless, the very real effect arsenic has on the dielectric constants of these products is clearly demonstrated in the examples recorded below.

I have further learned that the addition of about 0.1–0.5% CaO appears to "buffer" the effect which arsenic plays on the dielectric constants of these glass-ceramic products. As can be seen from the values set out in the following Table II, the increase in dielectric constant caused by a small addition of arsenic is very great. This sharp increase in value, it can be appreciated, makes control of a desired value quite difficult in commercial production. The addition of CaCO seems to suppress these sharp fluctuations in dielectric constant resulting from minor variations in arsenic content and enables close control to be maintained over the dielectric constant during production of these glass-ceramics. The mechanism of this interaction of arsenic and CaO is not known but the effect is real.

Finally I have found that the rate of cooling the body from the crystallization temperature to room temperature has an effect upon the dielectric constant of these glass-ceramics. Thus, a slow rate of cooling yields a body having a much higher dielectric constant than where the body is merely removed from the furnace at the crystallization temperature and allowed to quickly cool in the surrounding air. Therefore, a rate of cooling less than 5° C./minute is to be preferred and, ideally, a rate of cooling of about 1° C./minute or less.

Various compatible metal oxides may be present in these glass-ceramics provided the amount thereof does not exceed about 5% by weight in total. The presence of the alkali metal oxides deleteriously affects the electrical properties of these bodies and the total of these should not exceed about 3% by weight. Other oxides such as $BaO$, $PbO$, $ZnO$, and $B_2O_3$ may be included where their presence does not seriously alter the physical properties of the glass-ceramic.

Table I records examples of glass-ceramic compositions, analyzed on the oxide basis in weight percent, which illustrate the effectiveness of $As_2O_3$ in improving the dielectric behavior of glass-ceramic bodies within the $MgO$-$Al_2O_3$-$SiO_2$-$TiO_2$ field of this invention and the "buffering" effect of CaO. It will be appreciated that the starting glass-forming batches for these products may be composed of any materials, either oxides or other compounds, which on being melted together homogeneously are converted to the desired oxide compositions in the proper proportions.

TABLE I

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| $SiO_2$ | 56.6 | 56.3 | 56.1 | 45.5 | 45.3 | 45.2 | 45.2 | 45.2 | 56.4 | 56.15 | 56.0 | 56.3 | 56.05 | 60.6 | 60.3 | 60.1 | 50.0 | 49.9 | 49.5 | 49.4 | 50.3 | 49.8 |
| $Al_2O_3$ | 17.7 | 17.6 | 17.5 | 30.6 | 30.4 | 30.3 | 30.4 | 30.4 | 19.9 | 19.8 | 19.6 | 19.8 | 19.8 | 21.2 | 21.1 | 21.0 | 27.3 | 27.2 | 27.1 | 27.0 | 27.4 | 27.2 |
| $MgO$ | 18.2 | 18.2 | 18.1 | 12.4 | 12.3 | 12.3 | 12.6 | 12.4 | 14.5 | 14.5 | 14.4 | 14.5 | 14.5 | 9.9 | 9.9 | 9.8 | 12.7 | 12.6 | 12.6 | 12.5 | 12.0 | 12.6 |
| $TiO_2$ | 7.4 | 7.4 | 7.4 | 11.4 | 11.4 | 11.3 | 11.4 | 11.4 | 9.1 | 9.1 | 9.2 | 9.04 | 9.1 | 8.2 | 8.2 | 8.2 | 9.9 | 9.8 | 9.8 | 9.8 | 9.9 | 9.8 |
| $As_2O_3$ | | 0.4 | 0.8 | | 0.4 | 0.8 | 0.4 | 0.4 | | 0.35 | 0.7 | 0.36 | 0.35 | | 0.4 | 0.8 | | 0.4 | 0.9 | 1.2 | 0.4 | 0.4 |
| CaO | 0.1 | 0.1 | 0.1 | 0.1 | 0.1 | 0.1 | | 0.2 | 0.1 | 0.1 | 0.1 | | 0.2 | 0.1 | 0.1 | 0.1 | 0.1 | 0.1 | 0.1 | 0.1 | | 0.2 |

Table II records the heat treating schedules, beginning and concluding at room temperature, employed to convert the glass to a glass-ceramic along with measurements of dielectric constants (8.6 Kmc.) of the glass-ceramic products at 25° C. and some determinations made on the glass-ceramic articles of the coefficient of thermal expansion ($\times 10^{-7}/°$ C.) between 25°–300° C., density (g./cc.), and modulus of rupture (p.s.i.). These measurements were made in accordance with conventional procedures. Table II also reports the crystal phases present in the glass-ceramic product of each example in the order of decreasing amount as determined by X-ray diffraction analysis and electron microscopy. Cordierite constitutes the great majority of the crystallization, the other phases often being noted in but trace amounts.

TABLE II

| Example No. | Heat Treating Schedule | Dielectric Constant | Density, Glass-Ceramics | Modulus of Rupture | Expansion | Crystal Phases Present |
|---|---|---|---|---|---|---|
| 1 | 210° C./hr. to 805° C. Held 805° C. for ½ hr. 4° C./hr. to 865° C. Held 865° C. for 1 hr. 140° C./hr. to 1,260° C. Held 1,260° C. for 8 hrs. Cooled at 210° C./hr. | 5.45 | 2.641 | 24,400 | 58.1 | Cordierite, alpha-Cristobalite, magnesium Dititanate. |
| 2 | 210° C./hr. to 810° C. Held 810° C. for 24 hrs. 60° C./hr. to 815° C. Held 815° C. for 24 hrs. 60° C./hr. to 820° C. Held 820° C. for 24 hrs. 60° C./hr. to 830° C. Held 830° C. for 48 hrs. 140° C./hr. to 1,260° C. Held 1,260°C. for 8 hrs. Cooled at 210° C./hr. | 5.50 | 2.658 | 26,200 | 60.3 | Cordierite, alpha-Cristobalite, Rutile, Magnesium Dititanate. |
| 3 | 210° C./hr. to 805° C. Held 805° C. for 96 hrs. 140° C./hr. to 1,260° C. Held 1,260° C. for 8 hrs. Cooled at 210° C./hr. | 5.63 | 2.658 | 26,500 | 57.3 | Cordierite, alpha-Cristobalite, Rutile, Magnesium Dititanate, Magnesium Metasilicate. |
| 4 | 210° C./hr. to 815° C. Held 815° C. for 4 hrs. 180° C./hr. to 1,385° C. Held 1,385° C. for 8 hrs. Cooled at 210° C./hr. | 5.73 | 2.637 | 25,200 | 19.1 | Cordierite, Magnesium Aluminum Titanate. |
| 5 | 210° C./hr. to 800° C. Held 800° C. for 4 hrs. 210° C./hr. to 1,150° C. Held 1,150° C. for ½ hr. 210° C./hr. to 1,380° C. Held 1,380° C. for 8 hrs. Cooled at 500° C./hr. | 5.76 | 2.644 | | 16.5 | Do. |
| | 210° C./hr. to 800° C. Held 800° C. for 4 hrs. 210° C./hr. to 1,150° C. Held 1,150° C. for ½ hr. 210° C./hr. to 1,380° C. Held 1,380° C. for 8 hrs. Cooled at 300° C./hr. | 5.78 | 2.645 | | | Do. |
| | 210° C./hr. to 800° C. Held 800° C. for 4 hrs. 210° C./hr. to 1,150° C. Held 1,150° C. for ½ hr. 210° C./hr. to 1,380° C. Held 1,380° C. for 8 hrs. Cooled at 120° C./hr. | 5.91 | 2.646 | | | Do. |
| | 210° C./hr. to 800° C. Held 800° C. for 4 hrs. 210° C./hr. to 1,150° C. Held 1,150° C. for ½ hr. 210° C./hr. to 1,380° C. Held 1,380° C. for 8 hrs. Cooled at 40° C./hr. | 6.21 | 2.651 | | | Do. |
| 6 | 210° C./hr. to 815° C. Held 815° C. for 5 hrs. 180° C./hr. to 1,130° C. Held 1,130° C. for ½ hr. 180° C./hr. to 1,375° C. Held 1,375° C. for 8 hrs. Cooled at 210° C./hr. | 6.23 | | | 13.9 | Cordierite, Rutile. |
| 7 | 210° C./hr. to 815° C. Held 815° C. for 3 hrs. 180° C./hr. to 1,180° C. Held 1,180° C. for ½ hr. 180° C./hr. to 1,365° C. Held 1,365° C. for 8 hrs. Cooled at 210° C./hr. | 6.70 | 2.644 | 21,000 | 13.5 | Do. |
| 8 | 210° C./hr. to 815° C. Held 815° C. for 8 hrs. 180° C./hr. to 1,340° C. Held 1,340° C. for 8 hrs. Cooled at 210° C./hr. | 6.57 | 2.643 | 23,400 | 15.5 | Do. |
| 9 | 210° C./hr. to 820° C. Held 820° C. for 2 hrs. 210° C./hr. to 1,260° C. Held 1,260° C. for 8 hrs. Cooled at 130° C./hr. | 5.40 | 2.596 | | | Cordierite, alpha-Cristobalite, Rutile, Magnesium Dititanate. |
| 10 | Same as Example 9 | 5.56 | 2.604 | | 57 | Do. |
| | 210° C./hr. to 820° C. Held 820° C. for 2 hrs. 210° C./hr. to 1,260° C. Held 1,260° C. for 8 hrs. Cooled at 500° C./hr. | 5.43 | 2.601 | | | Do. |
| | 210° C./hr. to 820° C. Held 820° C. for 2 hrs. 210° C./hr. to 1,260° C. Held 1,260° C. for 8 hrs. Cooled at 300° C./hr. | 5.43 | 2.603 | | | Do. |
| | 210° C./hr. to 820° C. Held 820° C. for 2 hrs. 210° C./hr. to 1,260° C. Held 1,260° C. for 8 hrs. Cooled at 40° C./hr. | 5.98 | 2.608 | | | Do. |
| 11 | 210° C./hr. to 820° C. Held 820° C. for 2 hrs. 210° C./hr. to 1,260° C. Held 1,260° C. for 8 hrs. Cooled at 120° C./hr. | 5.82 | 2.605 | | 38.2 | Do. |
| 12 | Same as Example 9 | 5.82 | 2.621 | | | Do. |
| 13 | Same as Example 9 | 5.49 | 2.596 | | | Do. |
| 14 | 210° C./hr. to 830° C. Held 830° C. for 1 hr. 180° C./hr. to 1,300° C. Held 1,300° C. for 8 hrs. Cooled at 210° C./hr. | 5.21 | 2.508 | 19,300 | 68.2 | Do. |
| 15 | Same as Example 14 | 5.44 | 2.526 | 19,900 | 68.9 | Do. |
| 16 | 210° C./hr. to 830° C. Held 830° C. for 2 hrs. 180° C./hr. to 1,300° C. Held 1,300° C. for 8 hrs. Cooled at 210° C./hr. | 5.59 | 2.527 | 21,400 | 68.4 | Cordierite, alpha-Cristobalite, Rutile. |
| 17 | 210° C./hr. to 805° C. Held 805° C. for 10 hrs. 210° C./hr. to 1,300° C. Held 1,300° C. for 1 hr. 4° C./hr. to 1,370° C. Held 1,370° C. for 2 hrs. Cooled at 500° C./hr. | 6.40 | 2.599 | | 15.1 | |
| 18 | Same as Example 17 | 6.60 | 2.606 | 22,000 | 14.6 | Cordierite, Rutile. |
| 19 | Same as Example 17 | 6.76 | 2.603 | | 14.0 | |
| 20 | Same as Example 17 | 7.01 | 2.604 | | | |
| 21 | Same as Example 17 | 6.82 | 2.602 | | | |
| 22 | Same as Example 17 | 6.51 | 2.603 | | 14.0 | |

Table II clearly demonstrates the marked effect which the addition of arsenic has upon the dielectric constants of the glass-ceramics encompassed in this invention. Hence, the dielectric constant can be varied from about 5.2 to over 7.0. Likewise, the "buffering" effect of CaO additions to the $As_2O_3$-containing glass-ceramics can also be discerned in comparing, say, Examples 7 and 8. And, finally, the improvement in the dielectric constant resulting from slowly cooling the crystallized body to room temperature from the crystallization ranges can be observed in the modifications of heat treatment recorded for Examples 5 and 10. Example 17 is my preferred composition since it represents the most ideal combination of good melting and forming properties with excellent physical properties. The heat treating schedule recorded therefor in Table II appears to yield the best combination of high dielectric constant and other desirable physical properties.

Laboratory testing has pointed out that the total crystallinity of the instant glass-ceramic products is dependent not only upon a time-temperature relationship but also to some degree upon the extent to which the batch ingredients are adaptable to the formation of crystal phases. The crystal contents of these products have been determined to be in excess of 50% by weight and are generally greater than 75% by weight. The size of the individual crystals is quite uniform substantially all being finer-grained than 20 microns in diameter.

I claim:

1. In the method for increasing the dielectric constant of a glass-ceramic article containing cordierite as the principal crystal phase, the improvement which comprises:

(a) adding arsenic oxide to a glass-forming batch to yield a glass composition consisting essentially, as analyzed by weight on the oxide basis, of about 45–62% $SiO_2$, 9–20 MgO, 15–32% $Al_2O_3$, 7–12% $TiO_2$, and 0.2–1.5% $As_2O_3$; and, thereafter, (b) melting said batch;

(c) simultaneously cooling the melt to a temperature at least below the transformation range of said melt and shaping a glass article therefrom;

(d) heating said glass article to a temperature between about 750°–1400° C. for a period of time sufficient to obtain the desired crystallization; and (e) cooling said crystallized article to room temperature.

2. In the method according to claim 1 wherein said glass composition contains 0.1–0.5% CaO.

3. In the method according to claim 1 wherein the time sufficient to obtain the desired crystallization ranges about 1–24 hours.

4. In the method according to claim 1 wherein said glass article is first heated to about 780°–840° C. for about 1–8 hours and subsequently heated to about 1180°–1400° C. for about 1–8 hours.

5. In the method according to claim 1 wherein said crystallized article is cooled to room temperature at a rate not exceeding about 5° C./minute.

References Cited

UNITED STATES PATENTS

| | | | |
|---|---|---|---|
| 2,920,971 | 1/1960 | Stookey | 106—39 |
| 3,157,522 | 11/1964 | Stookey | 106—39 |
| 3,268,315 | 8/1966 | Stookey | 106—39 |
| 3,275,493 | 9/1966 | MacDowell | 106—39 |

HELEN M. McCARTHY, Primary Examiner

U.S. Cl. X.R.

106—39, 52

UNITED STATES PATENT OFFICE
CERTIFICATE OF CORRECTION

Patent No. 3,490,888 January 20, 1970

Guy E. Stong

It is certified that error appears in the above identified patent and that said Letters Patent are hereby corrected as shown below:

In the heading to the printed specification, line 5, "Strong" should read -- Stong --. Columns 3 and 4, TABLE I, fifth column, line 4 thereof, "12.3" should read -- 12.4 --. Column 3, line 67, "match" should read -- batch --. Column 4, line 8, "CaCO" should read -- CaO --.

Signed and sealed this 17th day of November 1970.

(SEAL)
Attest:

Edward M. Fletcher, Jr.  WILLIAM E. SCHUYLER, JR
Attesting Officer  Commissioner of Patents